(12) United States Patent
Jiang et al.

(10) Patent No.: US 11,964,384 B2
(45) Date of Patent: Apr. 23, 2024

(54) CURVED ORIGAMI-BASED METAMATERIALS FOR IN SITU STIFFNESS MANIPULATION

(71) Applicants: Hanqing Jiang, Chandler, AZ (US); Zirui Zhai, Tempe, AZ (US)

(72) Inventors: Hanqing Jiang, Chandler, AZ (US); Zirui Zhai, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 221 days.

(21) Appl. No.: 17/449,351

(22) Filed: Sep. 29, 2021

(65) Prior Publication Data
US 2022/0097240 A1    Mar. 31, 2022

Related U.S. Application Data

(60) Provisional application No. 63/085,741, filed on Sep. 30, 2020.

(51) Int. Cl.
*B25J 15/00* (2006.01)
*B63B 5/00* (2006.01)
*B63B 35/00* (2020.01)

(52) U.S. Cl.
CPC ............ *B25J 15/0033* (2013.01); *B63B 5/00* (2013.01); *B63B 35/00* (2013.01); *B63B 2231/40* (2013.01)

(58) Field of Classification Search
CPC ........ B25J 15/0033; B63B 5/00; B63B 35/00; B63B 2231/40; F16F 15/00; F16F 15/02; F16F 15/04; F16F 7/00; G10K 11/00; G10K 11/16

USPC ......................................................... 114/65 R
See application file for complete search history.

(56) References Cited

U.S. PATENT DOCUMENTS

| 10,538,028 B2* | 1/2020 | Rogers ................. B32B 27/283 |
| 10,808,794 B1 | 10/2020 | Boyce et al. |
| 2016/0027427 A1 | 1/2016 | Yang et al. |
| 2018/0348025 A1 | 12/2018 | Jahromi et al. |

FOREIGN PATENT DOCUMENTS

| CN | 107654567 A | 2/2018 |
| CN | 108799405 A | 11/2018 |
| WO | 2018189719 A1 | 10/2018 |

OTHER PUBLICATIONS

Ryu, J. et al. Photo-origami-Bending and folding polymers with light. Applied Physics Letters 100, (2012).
Sharp, R. et al. An evaluation of passive automotive suspension systems with variable stiffness and damping parameters. Vehicle System Dynamics 15, 335-350 (1986).

(Continued)

*Primary Examiner* — Lars A Olson
(74) *Attorney, Agent, or Firm* — Michael Best & Friedrich LLP

(57) ABSTRACT

A curved origami-based metamaterial includes a panel of material having a plurality of curved creases each disposed within a plane of the panel. The panel is configured to be folded along one of the plurality of creases, and the panel is also configured to be bent about an axis disposed outside the plane of the panel. Stiffness manipulation is configured to be achieved in situ by activating a different one of the plurality of curved creases.

16 Claims, 11 Drawing Sheets

(56) References Cited

OTHER PUBLICATIONS

Silverberg JL et al., Using origami design principles to fold reprogrammable mechanical metamaterials. science 345, 647-650 (2014).
Silverberg, J. L. et al. Origami structures with a critical transition to bistability arising from hidden degrees of freedom. Nature Materials 14, 389-393, (2015).
Song, Z. et al. Microscale Silicon Origami. Small 12, 5401-5406, (2016).
Tang et al. "Hybrid acoustic metamaterial as super absorber for broadband low-frequency sound"; Scientific Reports 7:43340; (2017).
Thrall, A. P. et al. Accordion shelters: A historical review of origami-like deployable shelters developed by the US military. Engineering Structures 59, 686-692, (2014).
Tu, M. et al. The control of wing kinematics by two steering muscles of the blowfly (*Calliphora vicina*). Journal of Comparative Physiology A 178, 813-830 (1996).
Wang, Z. et al. Origami-Based Reconfigurable Metamaterials for Tunable Chirality. Advanced Materials 29, 1700412, (2017).
Wei Y. et al., A novel, variable stiffness robotic gripper based on integrated soft actuating and particle jamming. Soft Robotics 3, 134-143 (2016).
Xu, S. et al. Assembly of micro/nanomaterials into complex, three-dimensional architectures by compressive buckling. Science 347, 154-159, (2015).
Yan Z. et al., Controlled Mechanical Buckling for Origami-Inspired Construction of 3D Microstructures in Advanced Materials. Advanced Functional Materials 26, 2629-2639 (2016).
Yasuda, H., et al. Folding behaviour of Tachi-Miura polyhedron bellows. Proceedings of the Royal Society a-Mathematical Physical and Engineering Sciences 469, (2013).
Yi, Y. W. et al. Magnetic actuation of hinged microstructures. Journal of Microelectromechanical Systems 8, 10-17, (1999).
Yokoyama, T., et al. Tensile Stress-strain Properties of Paper and Paperboard and Their Constitutive Equations. Journal of the Japanese Society for Experimental Mechanics 7, s68-s73, (2007).
Zhai, Z. et al., Origami-inspired, on-demand deployable and collapsible mechanical metamaterials with tunable stiffness. Proceedings of the National Academy of Sciences 115, 2032-2037 (2018).
Zhang et al. "Tensegrity cell mechanical metamaterial with metal rubber," Applied Physics Letters 113, 031906 (2018).
Zhang Y. et al., Printing, folding and assembly methods for forming 3D mesostructures in advanced materials. Nature Reviews Materials 2, 1-17 (2017).
F. P. Beer, E. R. Johnston, J. T. DeWolf, Mechanics of Materials (McGraw-Hill Higher Education, 2006).
J. P. Den Hartog, Mechanical vibrations (Courier Corporation, 1985).
Poston, T. & Stewart, I. Catastrophe Theory and its Applications. (Dover Publications, 2012).
R. M. Alexander, Elastic mechanisms in animal movement (Cambridge University Press Cambridge, 1988), vol. 404.
Berger, J. et al. Mechanical metamaterials at the theoretical limit of isotropic elastic stiffness. Nature 543, 533-537 (2017).
Boatti, E. et al. Origami metamaterials for tunable thermal expansion. Advanced Materials 29, 1700360 (2017).
Bolmin O. et al. (2017) Pop! Observing and Modeling the Legless Self-righting Jumping Mechanism of Click Beetles. In Conference on Biomimetic and Biohybrid Systems (Springer), pp. 35-47.
Borodulina, S., et al. Stress-strain curve of paper revisited. Nordic Pulp and Paper Research Journal 27, 318 (2012).
Carrella, A. et al. Static analysis of a passive vibration isolator with quasi-zero-stiffness characteristic. Journal of sound and vibration 301, 678-689 (2007).
Chen, T. et al. Harnessing bistability for directional propulsion of soft, untethered robots. Proceedings of the National Academy of Sciences 115, 5698-5702 (2018).
Chronopoulos et al., "Enhanced acoustic insulation properties of composite metamaterials having embedded negative stiffness inclusions," Extreme Mechanics Letters 12 (2017) 48-54.

Collins, S. et al. Efficient bipedal robots based on passive-dynamic walkers. Science 307, 1082-1085 (2005).
Dahiya, A. et al. (2017) Efficiently tunable positive-negative stiffness actuator. in 2017 IEEE International Conference on Robotics and Automation (ICRA) (IEEE), pp. 1235-1240.
Dias, M.A. et al. Geometric mechanics of curved crease origami. Physical review letters 109, 114301 (2012).
Dudte, L. H., et al. Programming curvature using origami tessellations. Nature Materials 15, 583-+, (2016).
Faber, J.A. et al. Bioinspired spring origami. Science 359, 1386-1391 (2018).
Fang, H. et al. Programmable Self-Locking Origami Mechanical Metamaterials. Advanced Materials 30, 1706311 (2018).
Farley, CT et al. Mechanism of leg stiffness adjustment for hopping on surfaces of different stiffnesses. Journal of applied physiology 85, 1044-1055 (1998).
Ferris, DP et al. Runners adjust leg stiffness for their first step on a new running surface. Journal of biomechanics 32, 787-794 (1999).
Filipov, E. T., et al. Origami tubes assembled into stiff, yet reconfigurable structures and metamaterials. Proceedings of the National Academy of Sciences of the United States of America 112, 12321-12326, (2015).
Ge, Q., et al. Active origami by 4D printing. Smart Materials and Structures 23, (2014).
Guest, S. D. et al. The Folding of Triangulated Cylinders .1. Geometric Considerations. Journal of Applied Mechanics—Transactions of the Asme 61, 773-777, (1994).
Haghpanah, B. et al. Multistable shape-reconfigurable architected materials. Advanced Materials 28, 7915-7920 (2016).
Hawkes, E. et al. Programmable matter by folding. Proceedings of the National Academy of Sciences of the United States of America 107, 12441-12445, (2010).
Hewage, T.A. et al. Double-Negative Mechanical Metamaterials Displaying Simultaneous Negative Stiffness and Negative Poisson's Ratio Properties. Advanced Materials 28, 10323-10332 (2016).
Hunt, G. W. et al. Twist buckling and the foldable cylinder: an exercise in origami. International Journal of Non-Linear Mechanics 40, 833-843, (2005).
Ibrahim R., Recent advances in nonlinear passive vibration isolators. Journal of sound and vibration 314, 371-452 (2008).
International Search Report and Written Opinion for Application No. PCT/US2020/039597 dated Sep. 25, 2020 (8 pages).
Janbaz, S. et al. Ultra-programmable buckling-driven soft cellular mechanisms. Materials Horizons 6, 1138-1147 (2019).
Jianguo, C. et al. Bistable Behavior of the Cylindrical Origami Structure With Kresling Pattern. Journal of Mechanical Design 137 (2015).
Jin L. et al. Guided transition waves in multistable mechanical metamaterials. Proceedings of the National Academy of Sciences 117, 2319-2325 (2020).
Judy, J. W. et al. Magnetically actuated, addressable microstructures. Journal of Microelectromechanical Systems 6, 249-256, (1997).
Kim, J., et al. Designing Responsive Buckled Surfaces by Halftone Gel Lithography. Science 335, 1201-1205, (2012).
Kim, J., et al. Thermally responsive rolling of thin gel strips with discrete variations in swelling. Soft Matter 8, 2375-2381, (2012).
Kim, S. et al. Soft robotics: a bioinspired evolution in robotics. Trends in biotechnology 31, 287-294 (2013).
Kuder, I.K. et al. Variable stiffness material and structural concepts for morphing applications. Progress in Aerospace Sciences 63, 33-55 (2013).
Kuribayashi, K. et al. Self-deployable origami stent grafts as a biomedical application of Ni-rich TiNi shape memory alloy foil. Materials Science and Engineering a-Structural Materials Properties Microstructure and Processing 419, 131-137, (2006).
Lee, T.U. et al. (2018) Curved-Crease Origami with Multiple States. in Origami 7: Seventh International Meeting of Origami Science, Mathematics, and Education, pp. 849-864.
Leong, T. G. et al. Tetherless thermobiochemically actuated microgrippers. Proceedings of the National Academy of Sciences of the United States of America 106, 703-708, (2009).

(56) References Cited

OTHER PUBLICATIONS

Li, S. et al. Recoverable and programmable collapse from folding pressurized origami cellular solids. Physical review letters 117, 114301 (2016).
Lin, C.-H. et al. Highly Deformable Origami Paper Photodetector Arrays. ACS Nano, (2017).
Liu, K. et al. Invariant and smooth limit of discrete geometry folded from bistable origami leading to multistable metasurfaces. Nature Communications 10, 4238 (2019).
Liu, Y., et al. Self-folding of polymer sheets using local light absorption. Soft Matter 8, 1764-1769, (2012).
Lv, C. et al. Origami based mechanical metamaterials. Scientific reports 4, 5979 (2014).
Maloiy, G. et al. Energetic cost of carrying loads: have African women discovered an economic way? Nature 319, 668-669 (1986).
Martinez, R. V., et al. Elastomeric Origami: Programmable Paper-Elastomer Composites as Pneumatic Actuators. Advanced Functional Materials 22, 1376-1384, (2012).
Miura, K. Method of packaging and deployment of large membranes in space. (Institute of Space and Astronomical Sciences, 1985).
Mu, X. M. et al. Photo-induced bending in a light-activated polymer laminated composite. Soft Matter 11, 2673-2682, (2015).
Na, J.-H. et al. Programming Reversibly Self-Folding Origami with Micropatterned Photo-Crosslinkable Polymer Trilayers. Advanced Materials 27, 79-85, (2015).
Nelson, BJ et al. Microrobots for minimally invasive medicine. Annual review of biomedical engineering 12, 55-85 (2010).
Noel, AC et al. Frogs use a viscoelastic tongue and non-Newtonian saliva to catch prey. Journal of the Royal Society Interface 14, 20160764 (2017).
Overvelde, J. T. B. et al. A three-dimensional actuated origami-inspired transformable metamaterial with multiple degrees of freedom. Nature Communications 7, (2016).
Overvelde, JTB et al. Amplifying the response of soft actuators by harnessing snap-through instabilities. Proceedings of the National Academy of Sciences 112, 10863-10868 (2015).
Pu H. et al., Multi-layer electromagnetic spring with tunable negative stiffness for semi-active vibration isolation. Mechanical Systems and Signal Processing 121, 942-960 (2019).

* cited by examiner

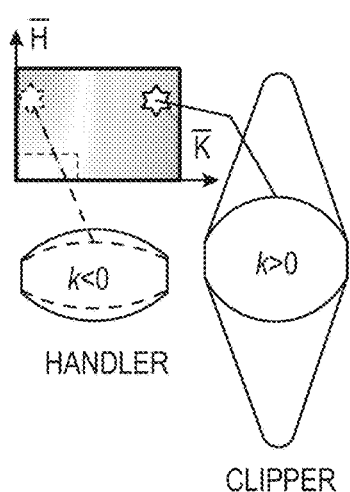
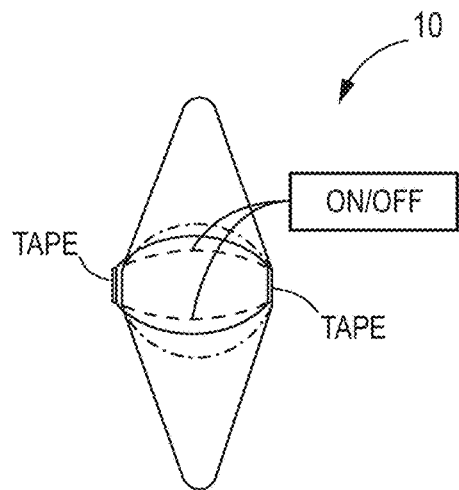
FIG. 3A
FIG. 3B
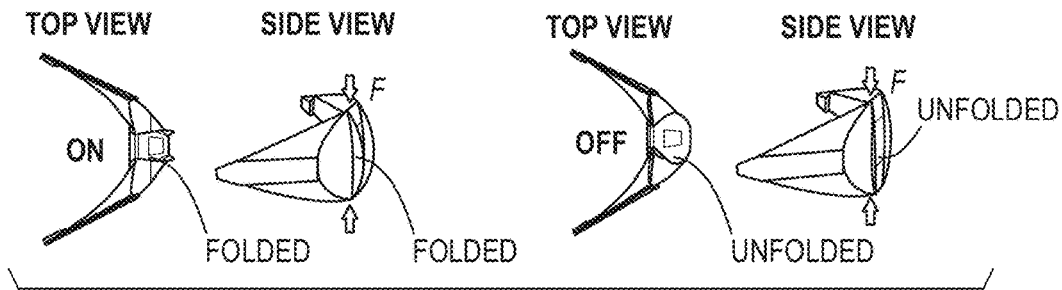
FIG. 3C
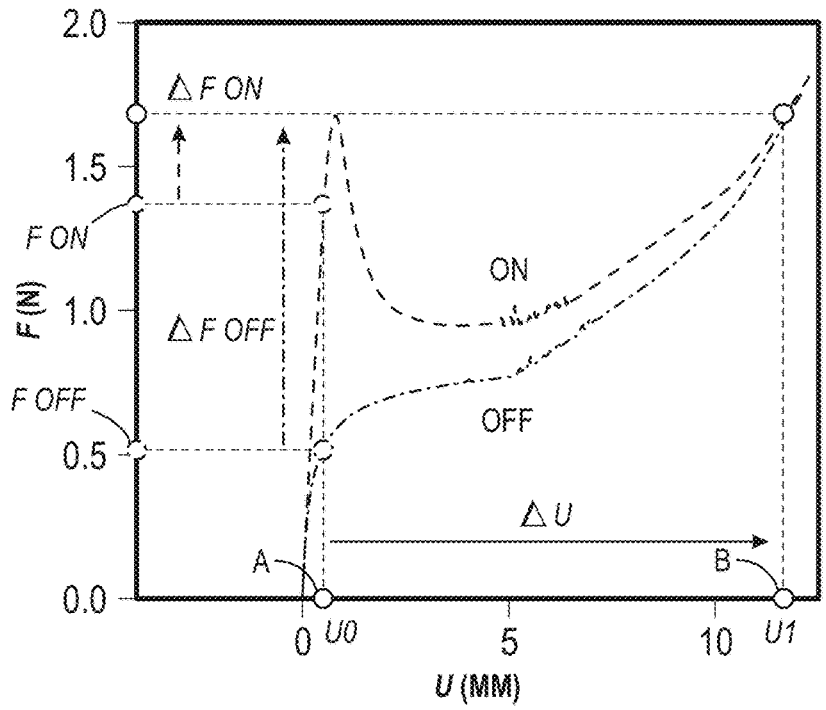
FIG. 3D

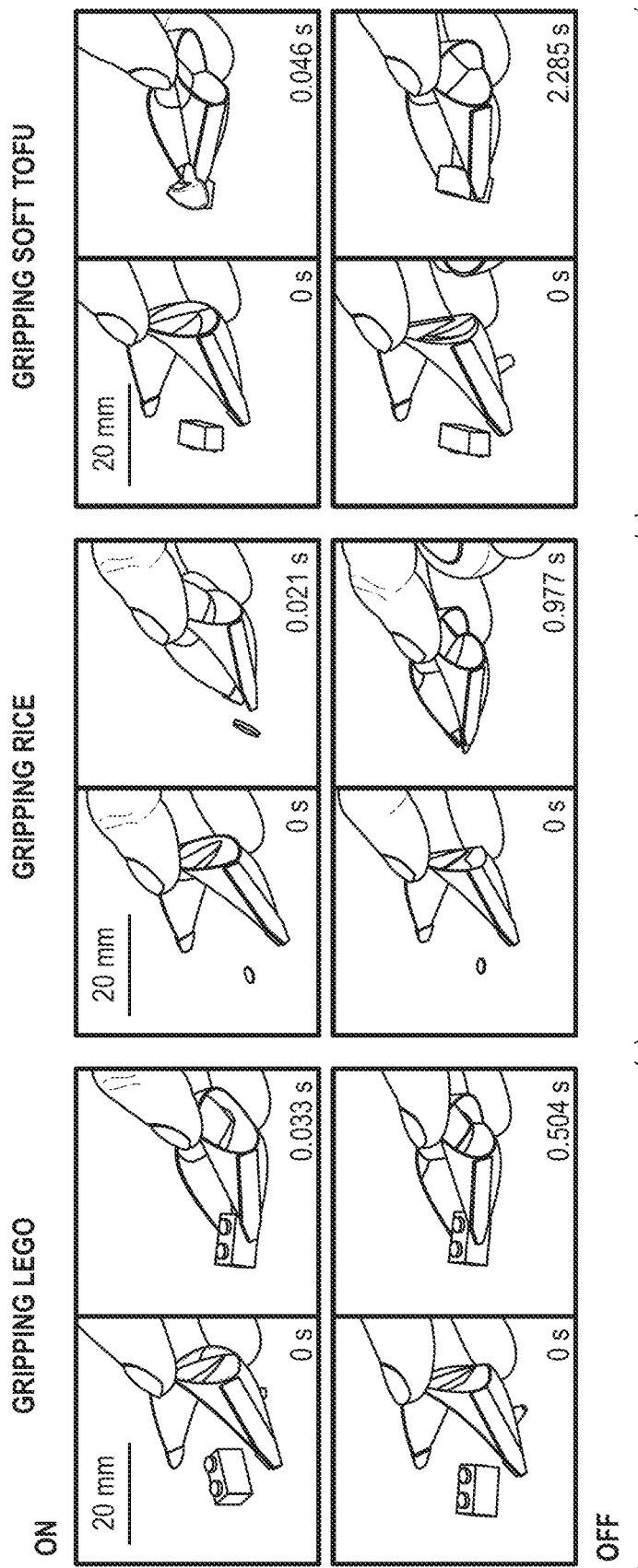
*FIG. 3E*  *FIG. 3F*  *FIG. 3G*

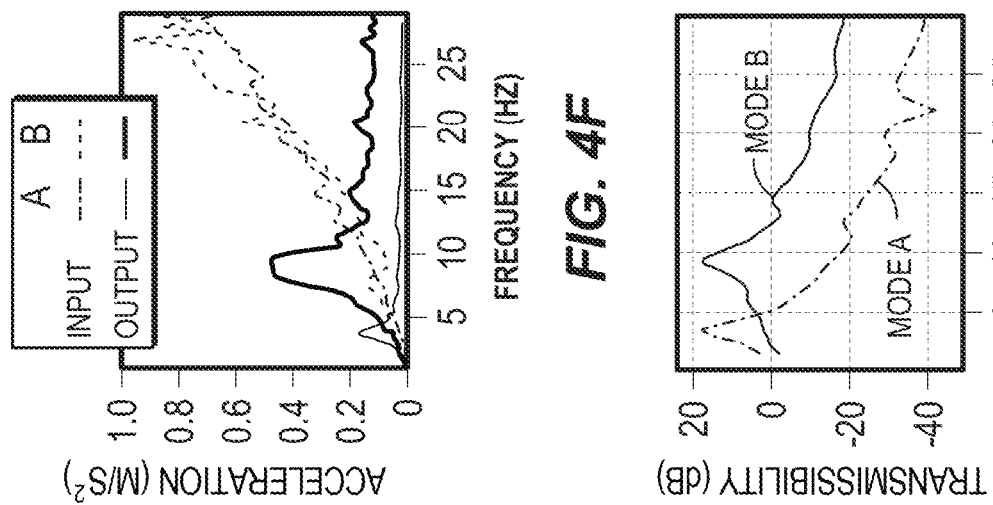
FIG. 4F
FIG. 4G
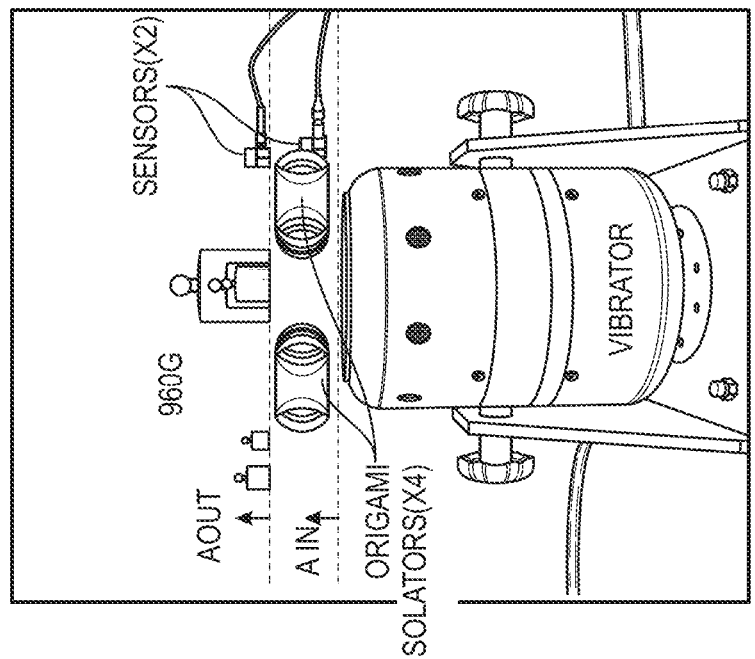
FIG. 4E
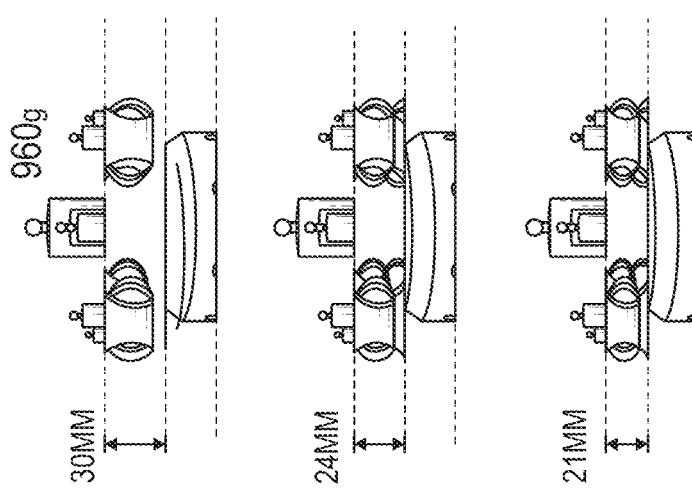
FIG. 4D

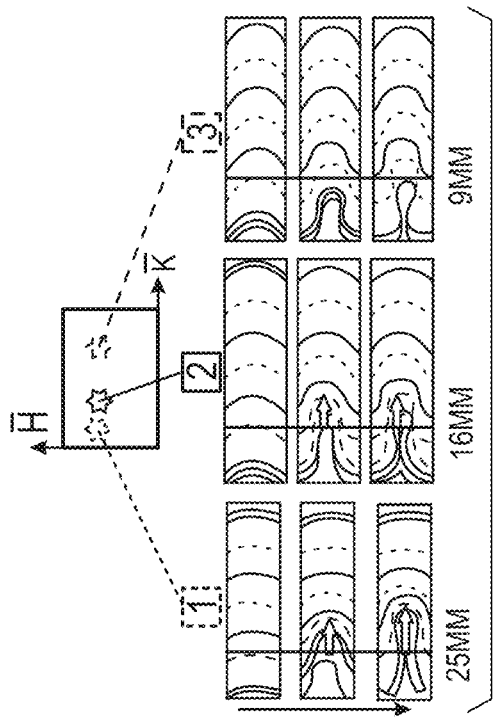
*FIG. 5A*
*FIG. 5B*
*FIG. 5C*
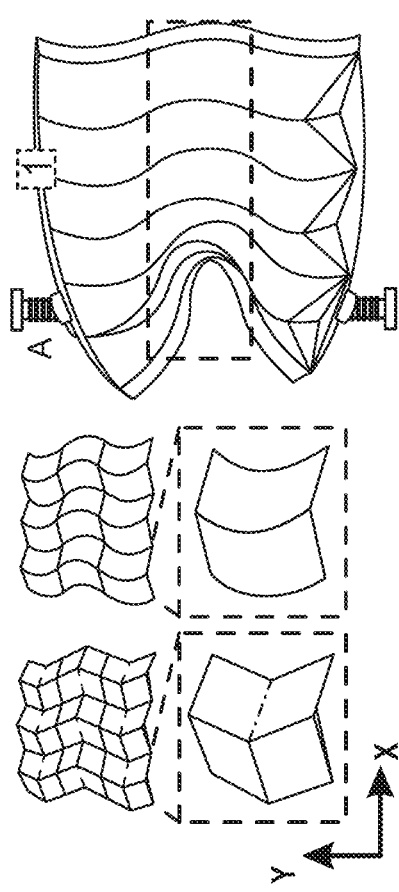
*FIG. 5D*
*FIG. 5E*
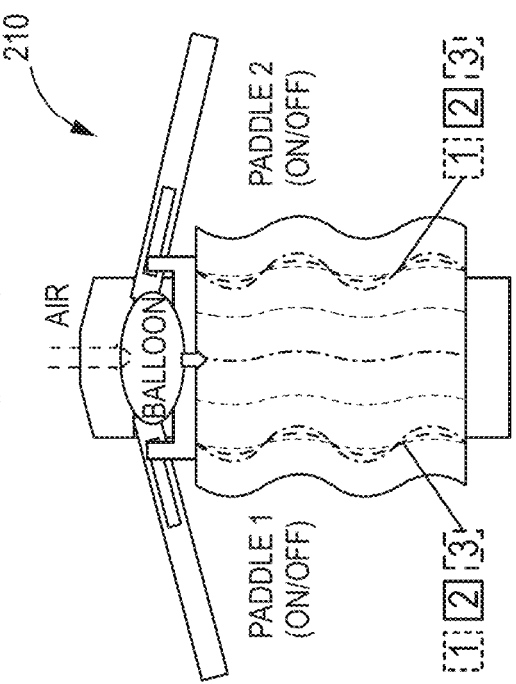
*FIG. 5G*

CURVED ORIGAMI-BASED METAMATERIALS FOR IN SITU STIFFNESS MANIPULATION

CROSS-REFERENCE TO RELATED APPLICATIONS

This application priority to U.S. Provisional Application No. 63/085,741, filed Sep. 30, 2020, the entire contents of which are incorporated herein by reference.

STATEMENT REGARDING FEDERALLY SPONSORED RESEARCH OR DEVELOPMENT

This invention was made with government support under 1762792 awarded by the National Science Foundation. The Government has certain rights in the invention.

FIELD

The present disclosure relates generally to origami-based metamaterials for use in providing varying degrees of stiffness in a material or structure.

BACKGROUND

The stiffness of a material or a structure is of key importance in most if not all applications, with positive stiffness as a common property for bearing loads and transferring motions, zero (or quasi-zero) stiffness for vibration isolation and protection, and negative stiffness for fast switching between states, high-speed actuation, and programmed deformation. Many species possess ingenious mechanisms to switch among different stiffnesses to maintain motion, save energy, or deliver high power. Scientists and engineers also have deliberately created various means to manipulate stiffness for applications ranging from automotive, robotics, to aerospace, though these mechanisms are rather complicated (e.g., spring structures) and many times require considerable energy inputs (e.g., electromagnetic mechanism), which unfortunately cannot be employed in size-limiting applications (e.g., small sized robots, soft robots without rigid parts or passive systems without power input), although these applications may represent the true need for in-situ stiffness manipulation. To somewhat circumvent the complex structures and expensive energy input, mechanical metamaterials have been designed to achieve stiffness manipulation using simple mechanisms, though the range of manipulation is limited and cannot switch all the way from positive to negative for a given metamaterial.

SUMMARY

In one embodiment, a curved origami-based metamaterial includes a panel of material having a plurality of curved creases each disposed within a plane of the panel. The panel is configured to be folded along one of the plurality of creases, and the panel is also configured to be bent about an axis disposed outside the plane of the panel. Stiffness manipulation is configured to be achieved in situ by activating a different one of the plurality of curved creases.

In another embodiment, a universal gripper includes a first plastic film and a second plastic film. Each of the first and second plastic films includes a set of curved creases, and stiffness manipulation is configured to be achieved in situ by activating and deactivating the curved creases.

In yet another embodiment, a method of stiffness manipulation in situ includes providing a material having a first curved crease disposed within a plane of the material, the first curved crease corresponding to a negative stiffness, a second curved crease disposed within the plane of the material, the second curved crease corresponding to a zero stiffness, and a third curved crease disposed within the plane of the material, the third curved crease corresponding to a positive stiffness. The method also includes folding material about a selected one of the first curved crease, the second curved crease, or the third curved crease, and activating the selected crease by bending the material after the step of folding. The method also includes activating a different crease selected from the first curved crease, the second curved crease, and the third curved crease to change an overall stiffness of the material.

Other aspects of the disclosure will become apparent by consideration of the detailed description and accompanying drawings.

BRIEF DESCRIPTION OF THE DRAWINGS

FIGS. 3*a-g* illustrate a first application of an origami-based metamaterial for in situ stiffness manipulation.

FIGS. 4*a-g* illustrate a second application of an origami-based metamaterial for in situ stiffness manipulation.

FIGS. 5*a-h* illustrate a third application of an origami-based metamaterial for in situ stiffness manipulation.

Figure 1A:
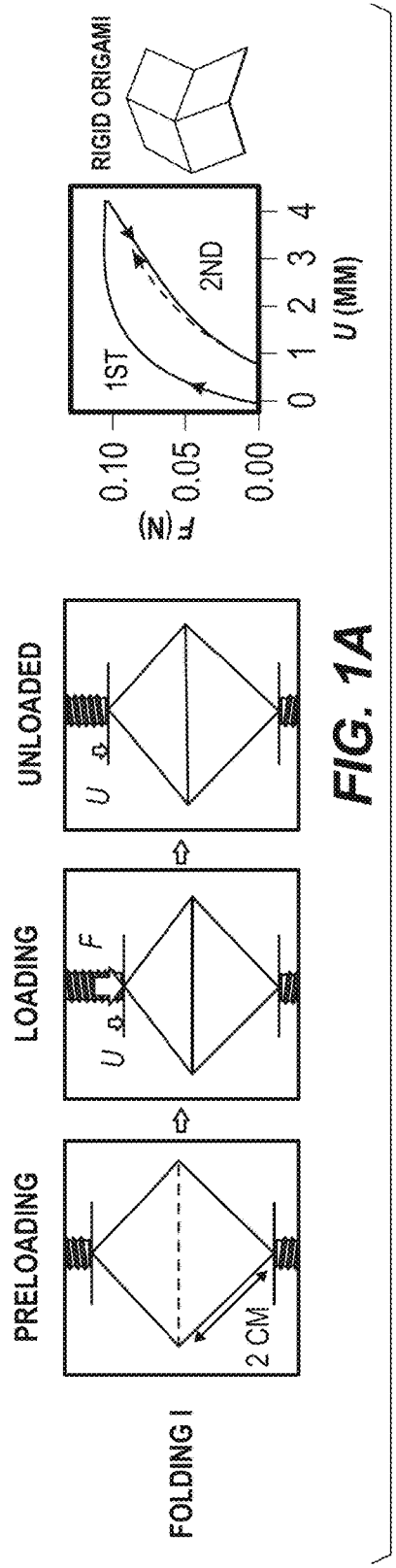
FIGS. 1*a-g* illustrate steps for forming a curved origami-based metamaterial.

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

DETAILED DESCRIPTION

Origami provides an elegant means to design metamaterials with tunable properties, such as diverse spatial configuration, on-demand deployability, controllable multistability, and tunable thermal expansion and stiffness. However, these strategies for tunable stiffness cannot achieve in-situ stiffness manipulation, i.e., the stiffness cannot be altered on-demand once the pattern is determined. In addition to the incapability for in-situ stiffness manipulation, it is also noticed that the current origami-based metamaterials are solely based on straight-creased patterns, particularly the so-called rigid origami patterns, in which the deformation energy is theoretically only stored at the creases, not in the origami panels. For example, the well-known Miura pattern and its derivatives have been extensively utilized. Though simple, rigid origami patterns have an inherent limitation when used for tunable stiffness: single energy input from the folding of creases leads to simple energy landscape and thus limited range of tunability in stiffness. In order to create complex energy landscape, another energy input can be considered: energy in the origami panels. Deformable origami falls in this category, though the candidate patterns are very limited. In addition to in-plane energy in the panel, bending energy in the panel can also be introduced. By combining folding energy at the creases and bending energy in the panel, curved origami can be created. Different from straight creases, there can be multiple curved creases between two points rather than just one straight creases. The inventors have discovered that competition between bending energy in the panel and folding energy at the creases, along with multiple curved creases between two points may lead to in-situ stiffness manipulation covering positive, zero, to negative ranges.

The inventors have designed a family of curved origami-based metamaterials for in-situ stiffness manipulation. A specific unit cell of curved origami-based metamaterials was studied, which can be in-situ manipulated to exhibit positive, zero, or negative stiffness, and functions as a fundamental building block to design curved-origami based metamaterials with different stiffness. Three applications were created to demonstrate the unique functions of the metamaterials: a curved origami-based gripper with a negative-stiffness rapid mode or a positive-stiffness precise mode, a curved origami cubes for in-situ switching between a zero-stiffness vibration isolation mode, or a positive-stiffness responsive mode, and a two-dimensional modular metamaterial for programmable, multi-stage stiffness responses upon homogenous loading. This work provides an unprecedented principle to curved origami-based mechanical metamaterial for in-situ manipulating stiffness in full ranges, which can find applications in many fields.

Figure 1B:
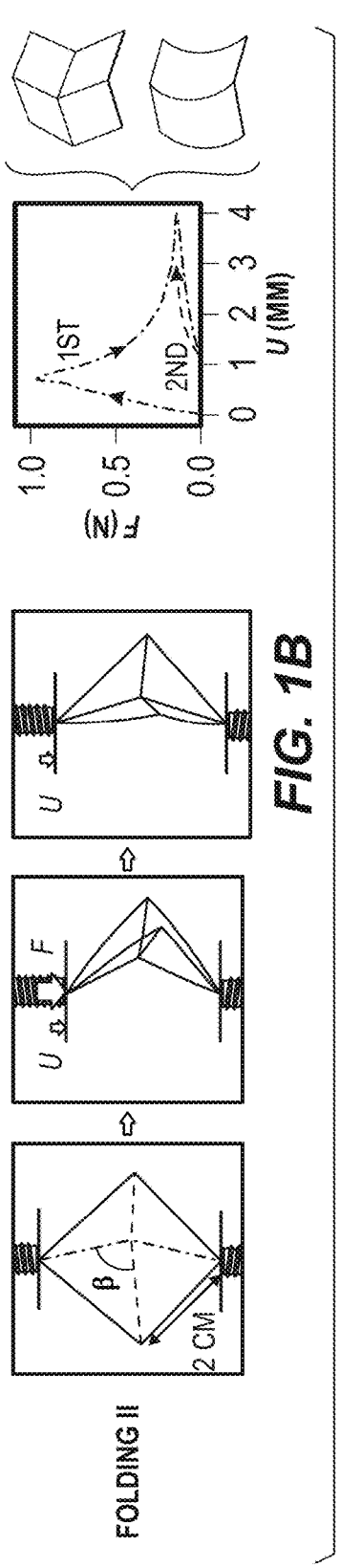
Figure 1C:
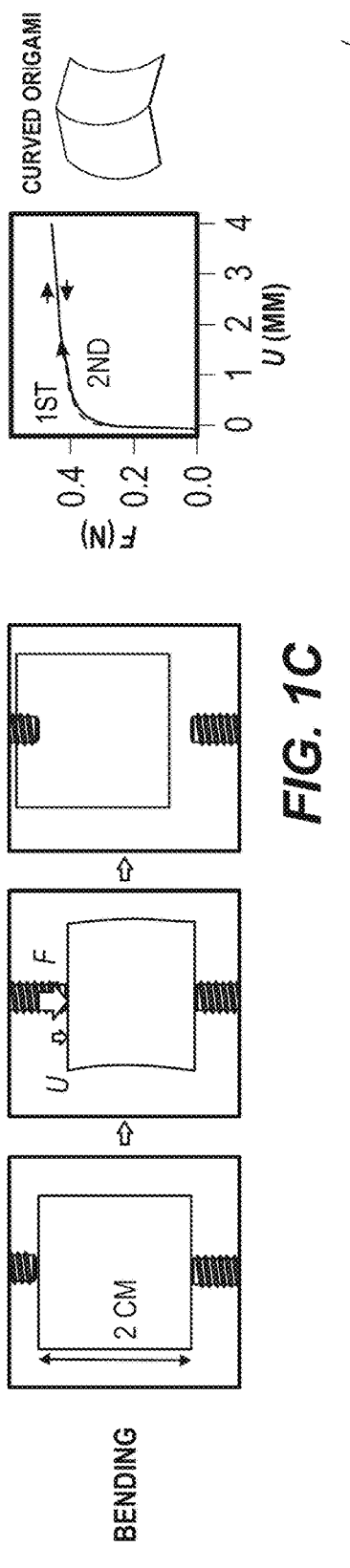

The inventors started by studying two fundamental deformation modes of origami, namely crease folding and panel bending, with the former for the deformation between creases and the latter for that in the panel. FIG. 1a shows the simplest folding (hereinafter called "folding I") where a horizontal valley crease (marked by a dashed line) is subjected to a compressive load F in the vertical direction. Being a rigid origami, the only resistance during compression is from the bending at the creases, which provides a positive stiffness during the $1^{st}$ loading. Upon unloading, the plastic deformation leads to a permanent shape and defines the folded state. The $2^{nd}$ loading follows the unloading path of the $1^{st}$ unloading, and the subsequent loading/unloading follows the same route. Another folding mode (hereinafter called "folding II") is when the folding direction is close to the loading direction (FIG. 1b), where a common cell for quadrilateral rigid origami (e.g., Miura pattern), i.e., a single-vertex, four-crease pattern with the angle β=80° between a mountain crease (marked by solid line) and valley creases (marked by dashed lines), is subjected to a compression force F in the vertical direction. Upon compression, this rigid origami shows a larger positive stiffness compared with that shown in FIG. 1a. In fact, for an ideal rigid origami, the initial positive stiffness should be infinite. Then this positive stiffness quickly transits to a negative stiffness due to the snap-through at the two vertical valley creases. Theoretical analysis and experimental tests have shown that positive to negative stiffness transition appears for larger β angles. Upon unloading, this pattern has plastic deformation, which is also observed in other "folding II" deformation with different β angles. The $2^{nd}$ loading follows the $1^{st}$ unloading's route and does not exhibit negative stiffness, because the permanent folded state after $1^{st}$ load has bypassed the critical point for the snap-through of the vertical creases. These two types of crease folding describe the key features of the rigid origami: positive stiffness from the creases perpendicular to the loading direction and negative stiffness from the creases close to the loading direction due to snap-through, though the negative stiffness may not re-appear after the $1^{st}$ loading. The third deformation mode is simply a bending mode, which provides positive stiffness and elastic deformation (FIG. 1c). When replacing the vertical straight creases by a curved crease and horizontal creases by the bending mode, curved origami appears. In some embodiments, the bending may occur about an axis out of the plane of the original panel, whereas the creases are in the plane of the original panel. Depending on the curvature of the curved crease, negative stiffness may occur upon compression due to the snap-through when the curvature is small (corresponding to a larger β angle for straight creases), while the bending mode provides the positive stiffness. Connecting two points, there can be multiple curved creases with different curvatures ($\kappa_1$, $\kappa_2$, $\kappa_3$) and possibly different stiffness ($H_1$, $H_2$, $H_3$) via means such as different thickness of the creases (FIG. 1d), which would provide a means to in-situ switch between different modes for various stiffness. This is the rationale to use curved origami to manipulate the stiffness.

Figure 1D:
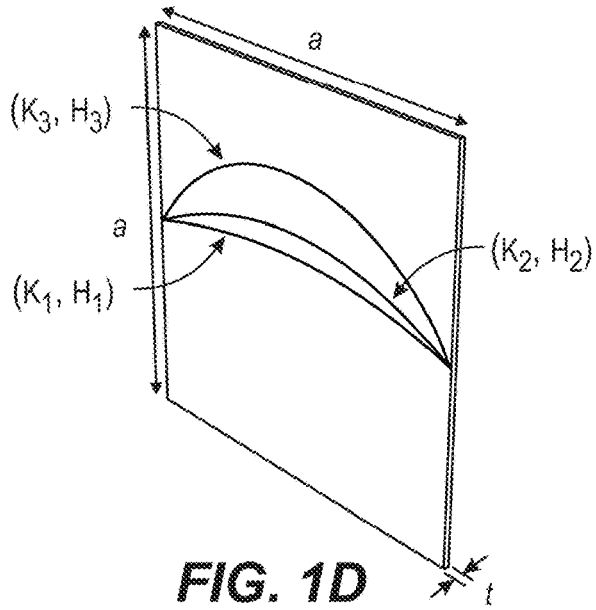

Finite element simulations via ABAQUS were conducted to study the stiffness of the square shaped panel (length a, thickness t, elastic modulus E) with co-existence of three arc-shaped creases (curvatures $\kappa_1$, $\kappa_2$, and $\kappa_3$) in the middle (FIG. 1d). The crease stiffness H is defined as the applied bending moment per folding angle per crease length and is normalized as $$\overline{H} = \frac{Ha}{Et^3}.$$

Figure 1E:
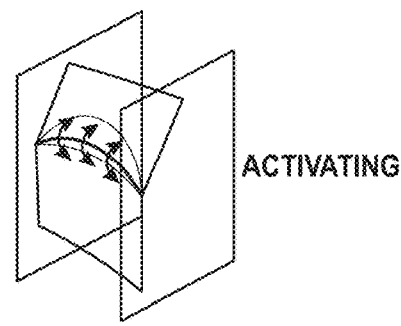
Figure 1F:
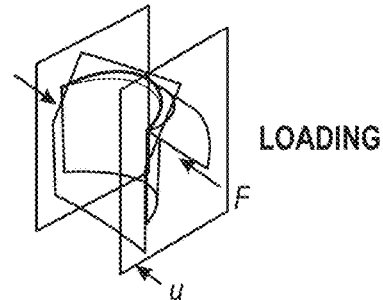
Figure 1G:
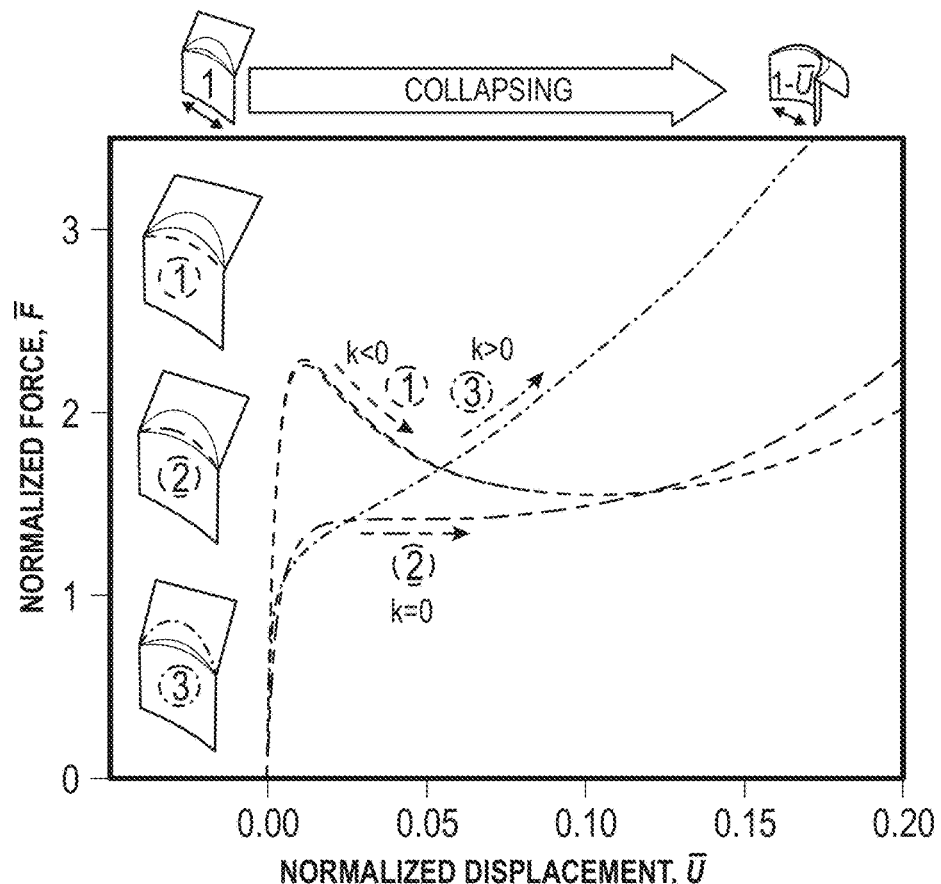

The arc-shaped crease can be activated by applying a bending deformation (FIG. 1e), and then a compressive load is applied (FIG. 1f). For a specific crease stiffness $\overline{H}_1$=0.07, $\overline{H}_2$=0.03, and $\overline{H}_3$=0.01, the relationship between normalized force $$\overline{F}\left(=\frac{Fa}{Et^3}\right)$$

and compressive displacement $$\overline{u}\left(=\frac{u}{a}\right)$$

is shown in FIG. 1g. Clearly, the same square with different creases have different stiffness, and it can be positive, zero, or negative, as highlighted in the blue shadowed area. Specifically, the crease ① with a smaller curvature $\kappa_1$ shows negative stiffness due to the snap-through similar to the folding II mode in FIG. 1b; the crease ② with a median curvature $\kappa_2$ has zero stiffness; and positive stiffness appears for a crease ③ with a larger curvature $\kappa_3$. The correlation between curvature and origami stiffness thus provides an elegant way to manipulate stiffness.

Figure 2A:
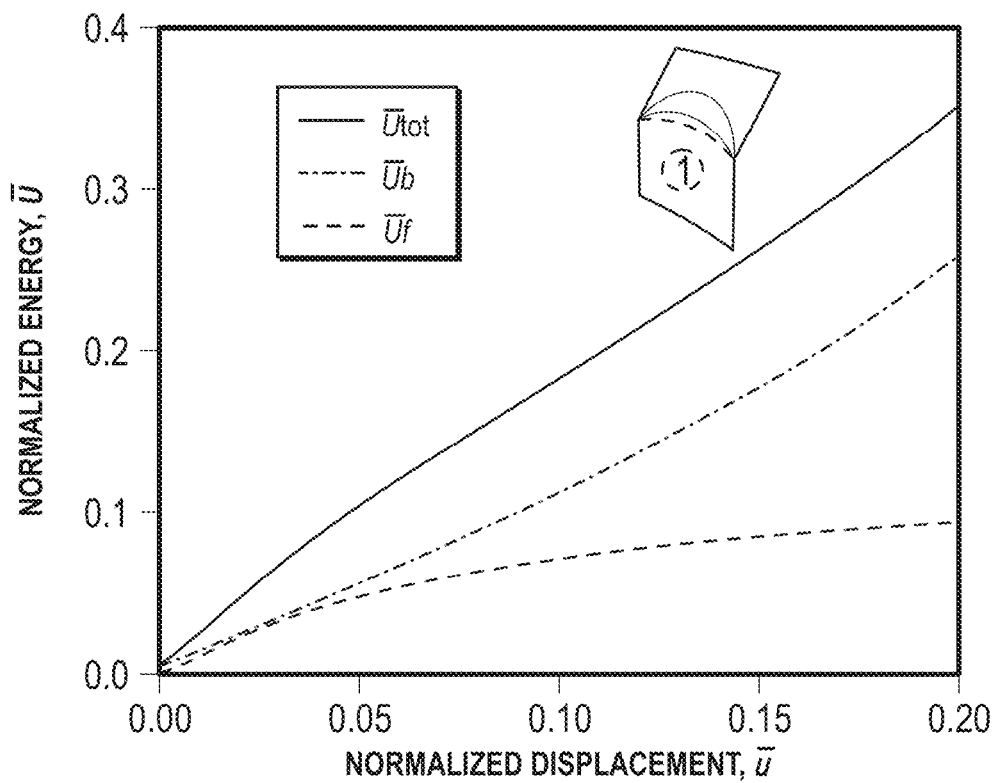
FIGS. 2*a-f* illustrate a mechanism to use the curved origami-based metamaterial for in situ stiffness manipulation.
Figure 2B:
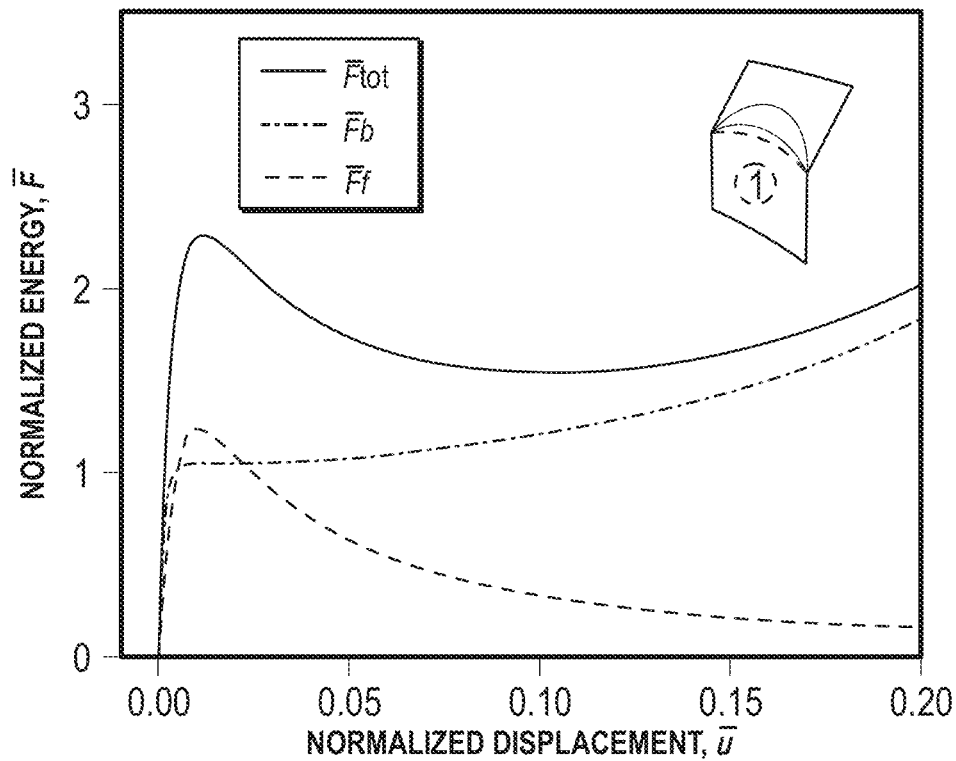

FIG. 2 presents the essential mechanism to use curved origami for in-situ stiffness manipulation. During the collapse of a curved origami, there are two parts of deformation energy, namely panel bending energy and crease folding energy. For a curved origami with only the crease ① activated (FIG. 1d), normalized bending energy in the panel $$\overline{U}_b\left(=\frac{U_b}{Et^3}\right),$$

folding energy at the curved crease $$\overline{U}_f\left(=\frac{U_f}{Et^3}\right),$$

and the total energy $$\overline{U}_{tot}\left(=\frac{U_{tot}}{Et^3}\right)$$

are plotted for varied displacement $$\overline{u}\left(=\frac{u}{a}\right)$$

in FIG. 2a. The total normalized reaction force $$\overline{F}_{tot}\left(=\frac{Fa}{Et^3}=\frac{\partial \overline{U}_{tot}}{\partial \overline{u}}\right),$$

derivative of the energy with respect to the displacement, can also be divided into two parts $$\overline{F}_b\left(=\frac{\partial \overline{U}_b}{\partial \overline{u}}\right)$$

due to panel bending and $$\overline{F}_f\left(=\frac{\partial \overline{U}_f}{\partial \overline{u}}\right)$$

due to folding at the crease, which are plotted in FIG. 2b for the crease ①. The bending deformation of panel provides positive stiffness, while the folding at the curved crease provides negative stiffness. By adjusting the contributions of panel and crease, positive, zero, and negative stiffness can just be achieved.

Figure 2C:
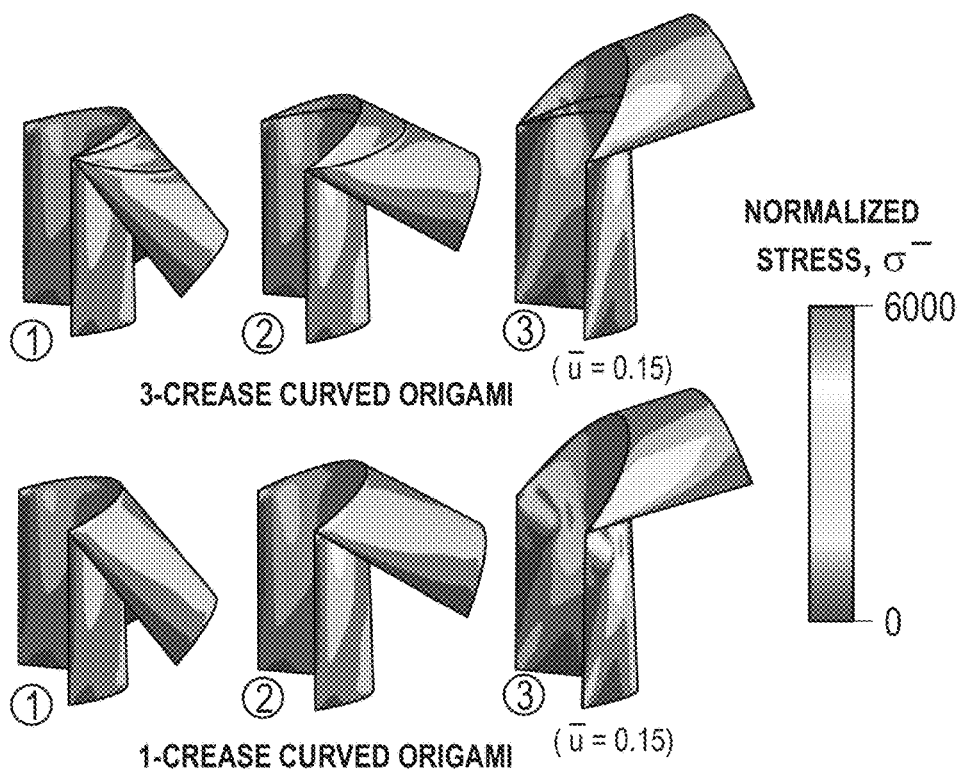
Figure 2D:
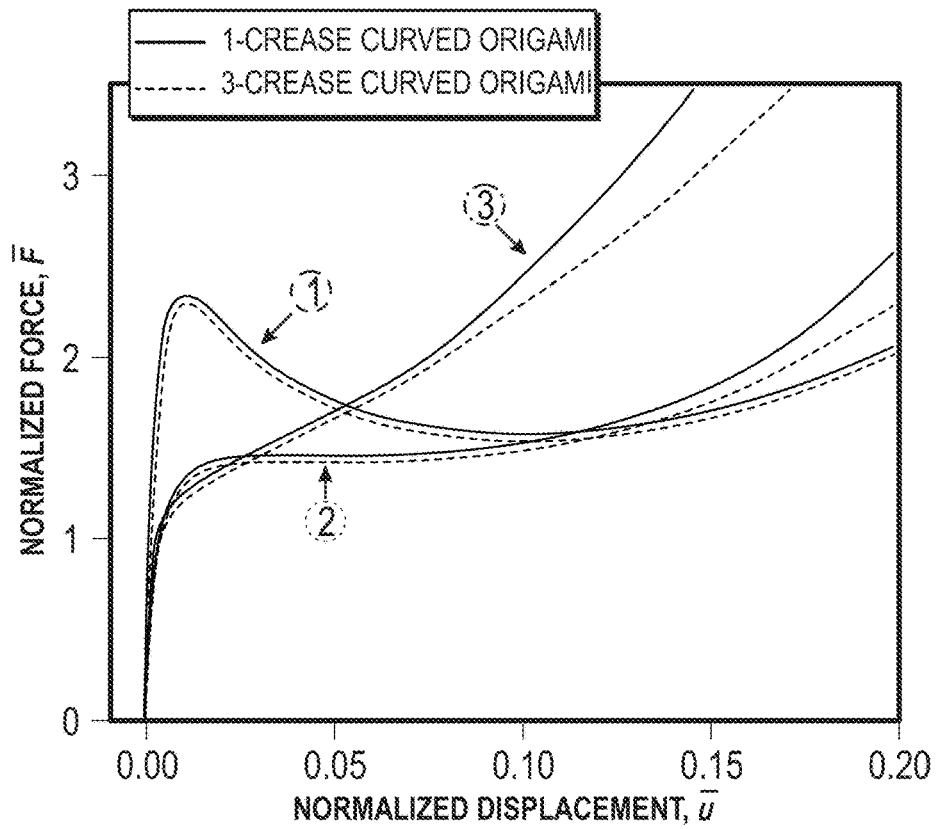

Individual activation of one of multiple co-existed curved creases without (or with negligible) interference among each other is a required characteristic for in-situ stiffness manipulation using curved origami. To verify this characteristic, FIG. 2c compares the deformation and stress contour for curved origami with three creases but only one activated (FIG. 1d) and its counterpart with only one curved crease at a given normalized displacement $\overline{u}$=0.15. It is clear that these two scenarios are undifferentiable at a given displacement. The relationship between reaction force $\overline{F}$ and displacement $\overline{u}$ for curved origami with three creases but only one activated and its counterpart with just one crease is shown in FIG. 2d, where negligible difference is observed for a given displacement range 0.025<$\overline{u}$<0.075 for all three curvatures. The negligible interference among curved creases suggests that the design principle for a single curved crease can be applied to design curved origami with co-existence of multiple curved creases, which leads an astounding merit to build a universal phase diagram of a single curved crease through two control parameters, namely normalized curvature $\overline{\kappa}$ (=$\kappa a$) and crease modulus $$\overline{H}\left(=\frac{Ha}{Et^3}\right).$$

Figure 2E:
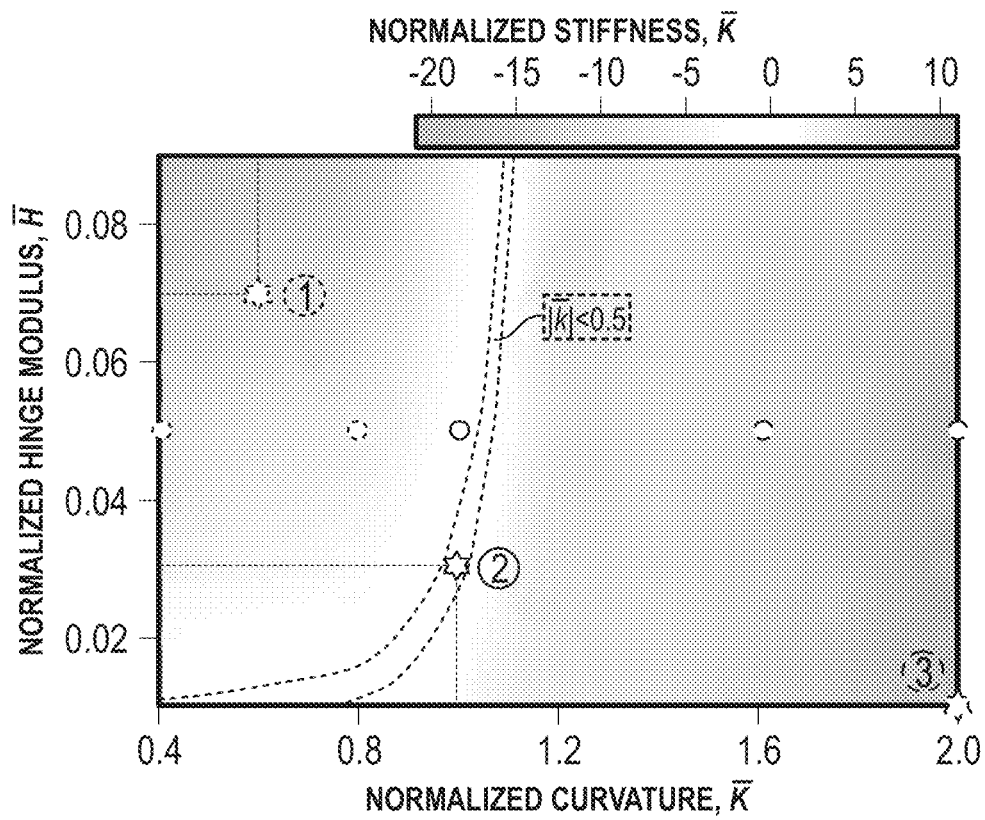
Figure 2F:
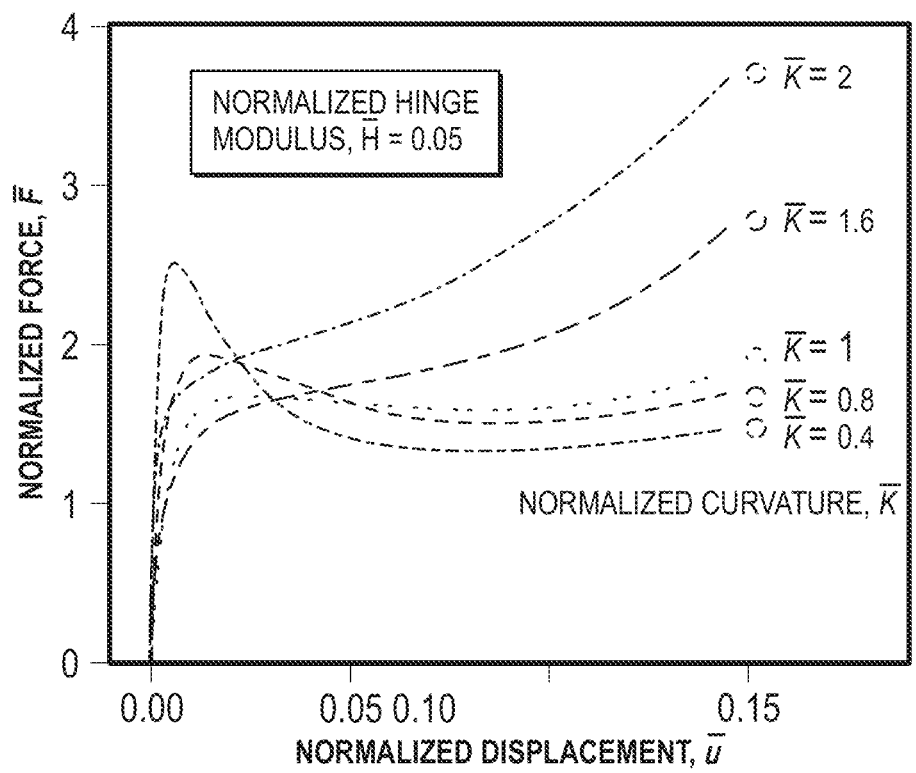

FIG. 2e provides such a phase diagram for a single crease with normalized curvature 0.1<$\overline{\kappa}$<0.5 and crease modulus 0.01<$\overline{H}$<0.09. It was observed that by changing the two control parameters $\overline{\kappa}$ and $\overline{H}$, one can readily design a curved origami to exhibit a wide spectrum of stiffness $$\overline{k}\left(=\frac{Fa^2}{Et^3}\right),$$

from positive, zero, to negative. Given that it is not operationally trivial to change creases modulus $\overline{H}$ and readily easy to alter the curvature $\overline{\kappa}$, the inventors determined a relationship between reaction force $\overline{F}$ and displacement $\overline{u}$ for a given crease modulus $\overline{H}$=0.05 and varying crease curvatures $\overline{\kappa}$=0.4, 0.8, 1, 1.6, and 2 in FIG. 2f, where the dots are also shown in FIG. 2e. This figure again shows in practical, one can achieve positive, zero, to negative stiffness by simply changing the curvature of a crease. Given the negligible interference among different creases, FIG. 2e essentially provides a design map to create multi-crease curved origami with any range of stiffness manipulation in two steps: (1) choosing a desired value of stiffness $\overline{k}$ from the stiffness phase diagram, and (2) then locating the corresponding crease curvature and crease modulus. The inventors demonstrated the in situ stiffness manipulation of curved origami using the following three applications/examples:

Application I: A Lightweight, Universal Gripper

With reference to FIG. 3, one example of a curved origami-based metamaterial 10 for in situ stiffness manipulation is a lightweight, universal gripper with two modes: negative stiffness mode for fast gripping and positive stiffness mode for precise gripping (FIG. 3). The gripper includes two plastic films namely one handler with ON/OFF switch for fast and precise gripping, respectively, and one clipper for gripping objects (FIG. 3a). The ON/OFF switch is realized by activating two curved creases (dashed lines (normalized curvature $\overline{\kappa}$=0.46, $\overline{H}$=0.072) with negative stiffness $$\left(k=\frac{\Delta F}{\Delta u}=-0.489 \text{ N/mm}\right)$$

at 0.3 mm<u<2 mm, and k=−0.016 N/mm at 3 mm<u<12 mm) for ON and deactivating it for OFF (k=0.001 N/mm at 0.3 mm<u<12 mm). The clipper has two curved creases (solid lines, normalized curvature $\bar{\kappa}=1.80$, $\bar{H}=0.072$) and has a positive stiffness (k=0.109 N/mm at 0.3 mm<u<12 mm) for actual gripping. The two pieces are connected by tapes as shown in FIG. 3b. The overall stiffness of the gripper can be switched between ON and OFF modes by (de)activating the curved creases. Top and side views of the gripper at ON and OFF modes are shown in FIG. 3c. As illustrated, rubbery pieces may be added to increase friction for gripping. To trigger the gripper to switch between ON and OFF modes, one can easily apply bending on the curved creases to lock the gripper in a desired mode.

FIG. 3d shows the force vs. displacement relationship for the ON/OFF modes. Under the same pre-compression with displacement $u_0$ at point A, the ON mode needs a larger pre-loading than that for the OFF mode, i.e., $F_{ON} > F_{OFF}$. Under the displacement-controlled loading, ON model has a smaller force increment $\Delta F_{ON}$ to reach the peak force and then a snap-through occurs, causing an instantaneous jump to the final state at point B with displacement $u_1$; while for the OFF mode, force gradually increase to the peak with a larger force increment $\Delta F_{OFF}$. It is clear that because of the negative stiffness for the ON mode, large power can be achieved through instantaneously large deformation from $u_0$=0.5 mm at the initial state to the final state $u_1$=11.6 mm; while for the OFF mode, monotonically increased gripping force can achieve precise handling.

The inventors conducted experiments to grip different objects with both modes in FIG. 3e-3g to demonstrate the importance of switching among ON and OFF modes. For those easy-to-grip objects, which are in medium size, regular shape, and frictional surface, the ON mode saved much time with rapid actuation. In FIG. 3e, when an ON mode was activated, the gripper spent 0.033 second (with 0.029 second before snap-through, and 0.004 second after snap-through) with a speed of 10 m/s (40 mm in 0.004 second), and spent 0.504 second with the OFF mode. The speed of gripping is higher than the speed of frog tongue when capturing a prey (1.67 m/s, 50 mm in 0.030 second). Compared with the OFF mode, the ON mode for gripping objects such as a Lego block saves time up to 0.471 s (i.e., 93.5% of time), providing a means for high-efficient gripping. However, there are also some hard-to-grip objects. Though the ON mode saved time, it may not be successful or even damage the objects. An example is a grain of rice (FIG. 3f), which is small, lightweight, and in an irregular shape. Using the ON mode to grip results in slipping and kicking the rice away. Using an OFF mode can accurately grip the rice without slipping. Another example is soft objects that are likely to be damaged for fast gripping. In FIG. 3g, soft tofu (modulus 8.005 kPa, strength 3.298 kPa, and toughness 875 J/m$^2$) was damaged when gripping with the ON mode, but was safely and effectively gripped with the OFF mode for precise gripping. The same principle may be used to design grippers with more than two modes, to realize more selectable modes of different speed, gripping force, and actuation response.

Figure 4A:
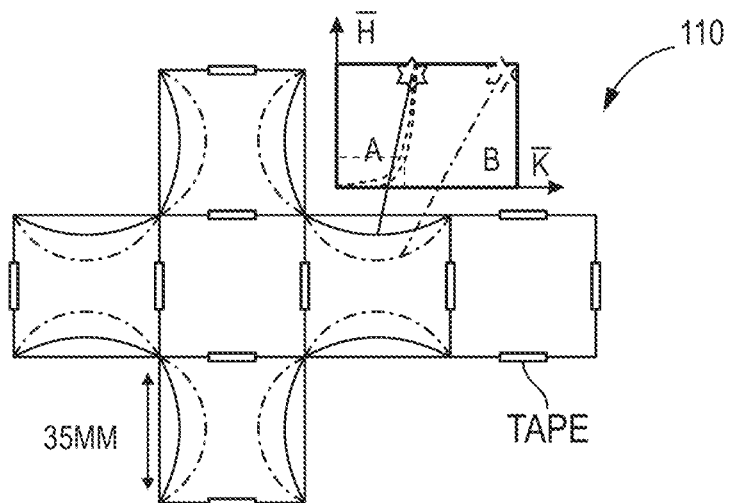
Figure 4B:
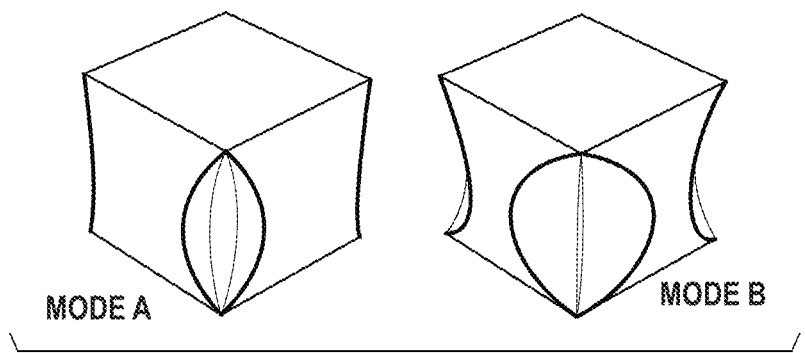
Figure 4C:
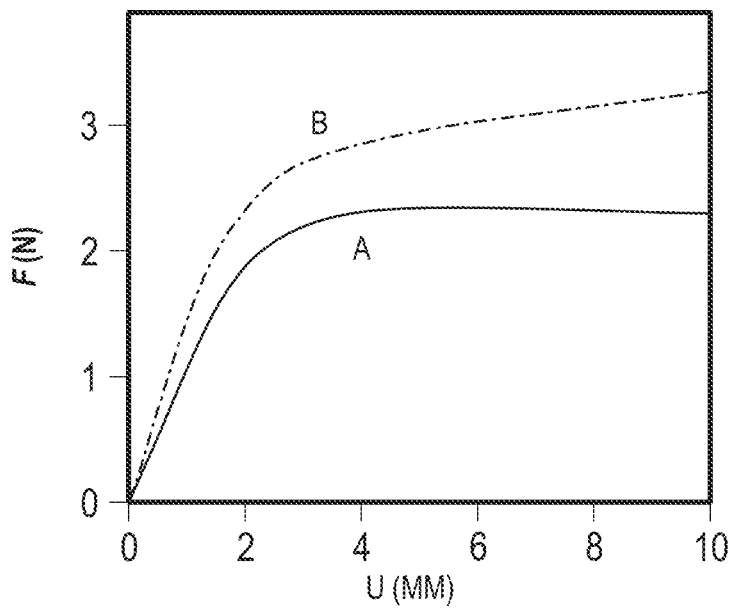

Application II: A Cube with Tunable Stiffness for Controllable Force Transmissibility With reference to FIG. 4, another example of a curved origami-based metamaterial 110 for in situ stiffness manipulation is a cube with tunable stiffness. This application utilizes the curved origami's in situ stiffness manipulation to control force transmissibility. The in situ tunability of force transmissibility is necessary in many situations. For example, people in many areas of the world habitually carry heavy loads on the head instead of by hands or on shoulders to save energy because of the lower stiffness of neck resulting to a lower force transmissibility, and thus reduced energy cost by the vibration of loads. Another example is the suspension system in automobile, which can be switched to a higher stiffness for responsive driving (i.e., sport mode), and a lower stiffness for smooth driving (i.e., comfort mode). Unfortunately, this system is too bulky and complicated to be applied in areas such as robotics. Here, the inventors designed curved origami-based cubes that can switch between an isolating and a responsive mode for low frequency ranges (e.g., lower than 20 Hz). The planar folding pattern is shown in FIG. 4a, in which the top and bottom panels/plates are 0.6 mm-thick plastic, while the side panels/plates are 0.125 mm-thick plastic. Tape was used to connect the panels and is represented by thick bars in the folding pattern. The folding creases for mode A ($\bar{\kappa}=1.1$, $\bar{H}=0.084$) and B ($\bar{\kappa}=1.9$, $\bar{H}=0.084$) are represented, with mode A for zero stiffness and mode B for a positive stiffness, and their locations on the stiffness phase diagram are explicitly shown in the inset of FIG. 4a. The finished cube at modes A and B are shown in FIG. 4b. FIG. 4c provides the reaction force-displacement relationship during compression for both modes, which clearly shows that mode A exhibits a quasi-zero stiffness and mode B has positive stiffness. Specifically, upon load 2.35 N, mode A shows almost zero stiffness. In other words, 2.35 N is the matching force to achieve quasi-zero stiffness. Around the critical load of 2.35 N, mode B has positive stiffness of k=0.584 N/mm.

The inventors used four curved origami cubes as an array for vibration isolation experiments. FIG. 4d shows that four curved origami cubes of mode A can stay balanced at any position when the matching weight 960 g (=4×2.35 N) is applied. A random vibration with a power spectrum spreading was used to test the performance of curved origami isolators. FIG. 4e shows the setup of the experiments. A electromechanical shaker (S 51120 from TIRA vibration Test Systems Inc.) was used to generate vertical vibration at varied frequencies, and two identical accelerate sensors (352C33 from PCB Piezotronics Inc.) were attached on the top and bottom surfaces, to record the input and output accelerations $\alpha_{in}$ and $\alpha_{out}$, respectively. Comparisons of the output and input accelerations of modes A and B for a random vibration and a frequency sweep are shown in FIG. 4f. The transmissibility of the curved origami isolators in dB is defined by $$20\log_{10}\left|\frac{a_{out}}{a_{in}}\right|.$$

FIG. 4g shows the transmissibility at frequencies from 1 Hz to 30 Hz for modes A and B. The isolators at mode A can isolate vibration (i.e., transmissibility less than 0) when the frequency is larger than 5 Hz. The transmissibility of mode B is about 20-30 dB higher than that of mode A, which means mode B can transfer vibration. Larger output vibration were observed at mode B for all ranges, suggesting a responsive mode. For mechanical vibration, the isolating range exists when vibration frequency is higher than the critical frequency $$\left(f_c = \frac{1}{2\pi}\sqrt{\frac{k}{m}} \quad (4)\right).$$

For mode A, the theoretical critical frequency is 0 because stiffness k is zero, which enables the ultra-low frequency vibration isolation. However, because of the plasticity of creases, the viscoelastic damping of panels, and the existence of tapes, isolation is only effective for frequency larger than 5 Hz. For mode B, the theoretical critical frequency i $$f_c = \frac{1}{2\pi}\sqrt{\frac{4\times 584 \text{ N/m}}{4\times 240 \text{ g}}} = 7.85 \text{ Hz,}$$

which results the isolating range (frequency higher than 12.5 Hz) of mode B. It is believed that this light-weight curved origami-based isolator can find many applications in soft and small robotics.

Application III: Curved Miura Pattern for In-Situ Multi-Stage Stiffness Response With reference to FIG. 5, another application of a curved origami-based metamaterial 210 for in situ stiffness manipulation is a two-dimensional (2D) modular metamaterial using curved origamis as building blocks, taking a similar way as the Miura pattern. The inventors were able to demonstrate an unprecedented capability of in-situ multi-stage stiffness response upon a uniform load. FIG. 5a shows a 3×3 Miura pattern, a 3×3 curved Miura pattern, and their corresponding unit cells. The curved Miura pattern replaces the mountain creases in the Miura pattern to a curved crease and other two creases by curved plates. When the top and bottom boundaries are constrained, curved Miura shows different behaviors from the Miura pattern during compression. Different deformation modes of curved Miura were observed upon different loading conditions (i.e., concentrated loading on concave side or convex side, and uniform loading), and it was found that the deformation can only transit from the concave side to the convex side. Moreover, when the concave segment was confined, the curved Miura became very stiff. FIG. 5b shows the deformation of a curved Miura with identical unit cells characterized by the curvature $\bar{\kappa}$ (=0.64) of the crease subjected to a compressive load along A-A direction. It was found that the concave segment snaps and transits to the right. This snap was ubiquitous for another crease with curvatures $\bar{\kappa}$=1.10 that has negative stiffness. For curved Miura patterns that have positive stiffness, the snap did not appear, and the applied force monotonically increased with the displacement. FIG. 5c compares these three curved Miura patterns with $\bar{\kappa}$=0.64 for ⓐ, $\bar{\kappa}$=1.10 for ⓑ, and $\bar{\kappa}$=1.62 for ⓒ. When 0.125 mm plastic film was used, the normalized crease modulus was $\bar{H}$=0.063. Based on the stiffness diagram (FIG. 2e), these three curved origami patterns had normalized stiffness $\bar{K}$=−10.6, −1.0, and 5.3, correspondingly, which led to snap-through behaviors for ⓐ and ⓑ, and global instability for ⓒ. Upon compression loading along A-A path at progressive displacement u=0 mm, 5 mm, and 10 mm, these three patterns showed different responses. The pattern ⓐ with the largest negative stiffness $\bar{K}$=−10.6 had the highest transverse displacement 25 mm, while the pattern ⓒ had positive stiffness $\bar{K}$=5.3 and the lowest transverse displacement 9 mm. This difference can be explained by the geometry of curved origami. Curved Miura with homogeneous curvature suggested a one-to-one relation between curvature and transverse displacement upon compressive loading, which led to the design of curved Miura with inhomogeneous curvatures.

Figures 5F, 5H:
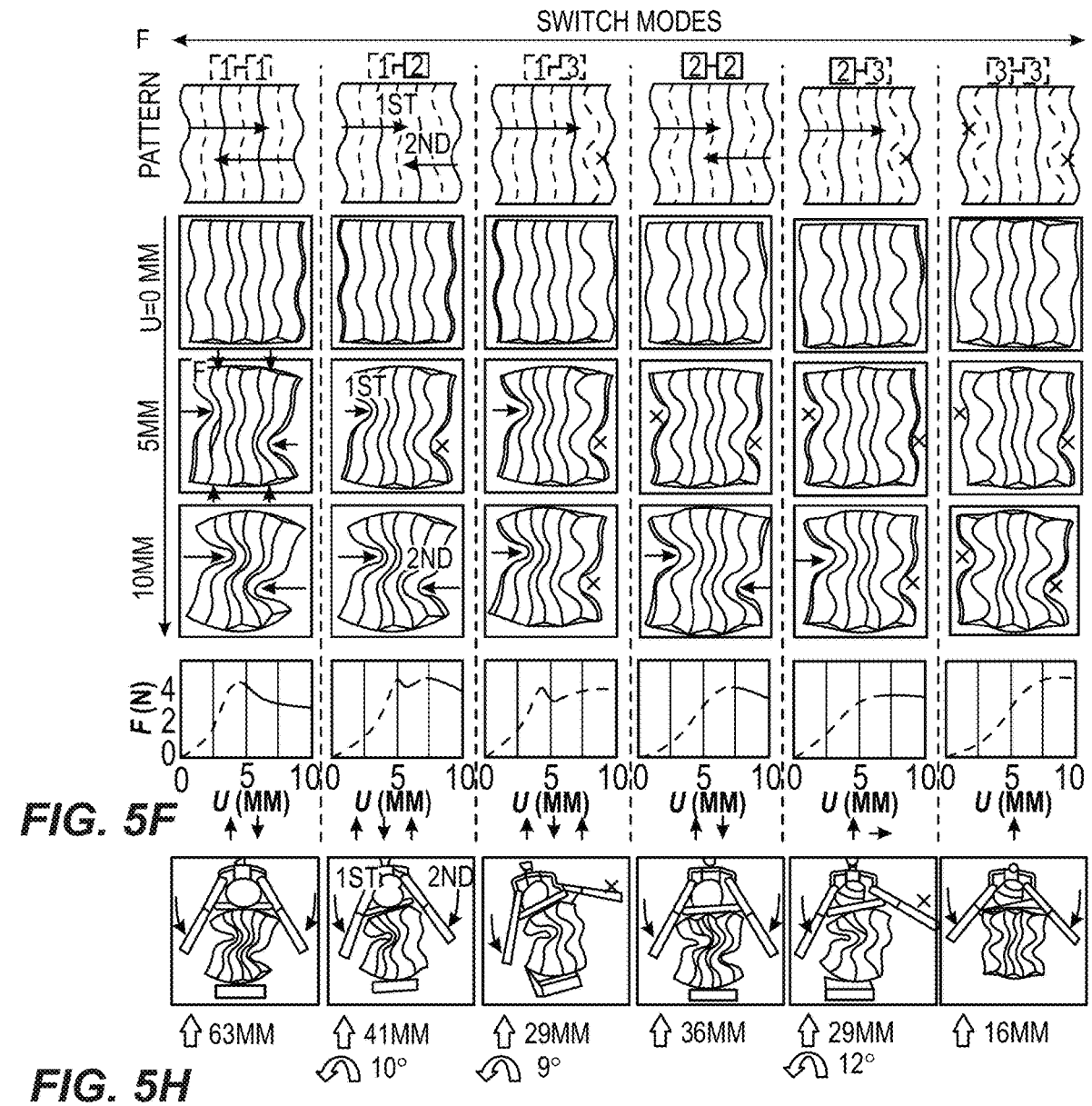

Curved Miura with inhomogeneous curvature can be modularly designed to achieve in-situ switching and multi-stage stiffness manipulation. FIG. 5d illustrates a 4×3 curved Miura with in-situ switchable creases along A-A and B-B paths. Along each path, three creases ⓐ, ⓑ, and ⓒ that were studied in FIG. 5c can be turned ON or OFF to control the transmissibility of the transverse buckling deformation. As shown in FIG. 5c, the transverse buckling always initiates at the concave site of a curved Miura and then propagates inward; thus, this 4×3 curved Miura has two transverse buckling paths along Γ and Ξ, and each path has three candidate curvatures ⓐ, ⓑ, and ⓒ. Thus, this 4×3 curved Miura can achieve 6 in-situ switchable and accessible states, representing the stiffness response. Considering symmetry, these states can be expressed by a 3×3 symmetric matrix shown in FIG. 5e. FIG. 5f shows the configurations of these 6 states and their force/displacement responses upon a uniform compressive load. It was found that multi-stage stiffness manipulation is accomplished by a uniform load depending on the ON/OFF combination of different creases. The diagonal components for the matrix in FIG. 5e represent the stiffness response when two identical creases were activated on both paths. When two creases ⓐ are activated on both paths Γ and Ξ (ⓐ-ⓐ combination), the reaction force of this curved Miura will undergo a single peak and then drop because of concurrent transverse buckling at both paths, denoted by a ↑↓ stiffness response (with ↑ for peak and ↓ for drop), and a similar situation occurs for a ⓑ-ⓑ combination. When crease ⓒ is turned ON for both paths, positive stiffness provides a monotonic increase force response, denoted by ↑. The off-diagonal components in FIG. 5e are for that with non-identical creases activated. When crease ⓐ is activated on path Γ and ⓑ on path Ξ (i.e., a ⓐ-ⓑ combination), the reaction force will experience a peak-valley-peak-valley roller-coaster change, i.e., a ↑↓↑↓ multi-stage stiffness response achieved by an uniform load. ⓐ-ⓒ combination shows a peak-valley-peak pattern, i.e., ↑↓↑. ⓑ-ⓒ combination shows a peak-flat pattern, i.e., ↑→. For a curved Miura with more unit cells (e.g., a 6×3 pattern) and the leftmost and rightmost creases have more choices on curvatures (e.g., 4), much more complicated stiffness response can be generated, which can be represented by multi-dimensional tensors. Inhomogeneous curved Miura with in-situ switchable curvatures produces complicated multi-stage stiffness responses upon uniform loading. Thus, a controllable and in-situ switchable nonlinear mechanism can find many applications, such as in robotics.

To demonstrate the application of the 4×3 curved Miura in robotics, the inventors built a pneumatic-driven, curved Miura-based swimming robot that can be in-situ switched among different actuation modes (FIG. 5g). When air filled the balloon, the inflation compressed a frame glued to the curved Miura, and two paddles were attached to the frame via a sliding trench. When the frame moved downwards, the paddle rotated, and the rotation increased with the displacement of the frame. Based on the matrix in FIG. 5e, the stiffness response with a mode will lead to a sudden displacement of the frames and thus a larger rotation of the paddle. Consequently, by altering the combinations (i.e., ⓐ-ⓑ, ⓑ-ⓒ), six types of complex motions can be in-situ realized through simple air flow. FIG. 5h shows the motion of the robot on water, by inflating the balloon using 50 ml air with a constant flow within 1 second. The activated paddle during motion is highlighted by an arrow, and the inactivated paddle is presented by a cross. The displacement and rotation resulted by an inflation are also presented in FIG. 5h. Modes ⓐ-ⓐ, ⓑ-ⓑ, and ⓒ-ⓒ have linear displacement without rotation, because of the symmetrical buckling in paths Γ and Ξ, with mode 🏛-🏛 leading the largest displacement 63 mm in 1 second because of the largest negative stiffness snap-through, mode 🏛-🏛 having 36 mm displacement because of the snap-through, and mode 🏛-🏛 generating the least displacement 16 mm because of positive stiffness. Modes 🏛-🏛, 🏛-🏛, and 🏛-🏛 provide both linear displacement and rotation because of the asymmetrical deformation of the two paths. The other three modes (i.e., 🏛-🏛, 🏛-🏛, and 🏛-🏛) in FIG. 5e also have asymmetrical motion but clockwise rotation.

This particular application, as with the others described above, only presents some of the possible applications to employ the in-situ multi-stage stiffness response rooted from curved origami. Overall, Curved origami may be used accomplish in-situ stiffness manipulation by changing the curvature of the creases. The variation of stiffness among positive, zero, and negative results from the combination of crease folding and panel bending with the former providing a negative stiffness and the later for a positive stiffness. The in situ stiffness manipulation may be achieved by activating different curved creases on a curved origami with the co-existence of multiple creases. A universal stiffness design diagram was discovered, and can be used to design curved creases for specific applications. Three applications were developed to highlight the versatility of the curved origami, including a universal and lightweight gripper, a cube with tunable stiffness for controllable force transmissibility, and curved Miura patterns for in-situ multi-stage stiffness response. This work presents an essential and an elegant resolution to utilize curved origami for complicated, in situ stiffness manipulation, which opens an unexplored direction to design mechanical metamaterials.

Like many other mechanical metamaterials, the presented curved origami systems may need to be tuned mechanically and manually. A remote-control method may provide better applicability, which can be realized by utilizing temperature-activated, photo-activated, electronic, and magnetic materials on the creases. Moreover, the principle of design curved origami can be extended from the present one-dimensional (e.g., the gripper and isolator applications) and two-dimensional (e.g., the curved Miura pattern and its application in robots) patterns to three-dimensional and tessellated curved origami scenarios by combining the curved origami pattern and other existing designs in origami, e.g., Miura tube design, multi-layered Miura design, and structural designs inspired by origami.

The systems and concepts described herein establish an essential principle to utilize various curved origami patterns for designing mechanical metamaterials with unprecedented functions, including not only the stiffness manipulation, but also the re-programmability of deformation, which can be readily coupled with other physical fields, such as electromagnetics. Structures and metamaterials created in this principle can find applications in many fields, including daily essentials, protections, robotics, automotive, aerospace, and biomedical devices. The systems may utilize the mechanical energy stored within the panels of an origami structure instead of just the energy stored within the crease. This elegant methodology allows for far greater control of structure stiffness. This technology can be utilized to address a range of technological problems which are typically solved using complicated spring structures or high-powered electromagnets which are very energy intensive.

Stiffness manipulation represents one of the essential needs to tune motion, save energy, and deliver high powers, which has been studied by different means, including origami-based mechanical metamaterials, though high-efficient, in-situ stiffness manipulation is not achieved yet using elegant design. As described herein, curved origami patterns have been designed to successfully accomplish in-situ stiffness manipulation covering positive, zero, and negative stiffness, through activating pre-defined creases on one curved origami pattern. This elegant design enables in-situ stiffness switching in lightweight and space-saving applications, as demonstrated through, for example, the three robotic-related applications described above. Upon uniform load, the curved origami can achieve a universal gripper, controlled force transmissibility, and multi-stage stiffness response. This work endows curved origami an unexplored and unprecedent capability and open new applications in robotics for this particular family of origami patterns.

Although certain aspects have been described in detail with reference to certain preferred embodiments, variations and modifications exist within the scope and spirit of one or more independent aspects as described.

What is claimed is:

1. A curved origami-based metamaterial comprising:
    a panel of material having a plurality of curved creases each disposed within a plane of the panel;
    wherein the panel is configured to be folded along one of the plurality of creases, and wherein the panel is also configured to be bent about an axis disposed outside the plane of the panel;
    wherein stiffness manipulation is configured to be achieved in situ by activating a different one of the plurality of curved creases;
    wherein the panel of material defines an ON/OFF switch, wherein the origami-based metamaterial further includes a clipper coupled to the ON/OFF switch.

2. The curved origami-based metamaterial of claim 1, wherein the panel has been folded along the one of the plurality of creases, and wherein the panel has been bent about the axis disposed outside the plane of the panel.

3. The curved origami-based metamaterial of claim 1, wherein the plurality of curved creases includes a first curved crease corresponding to a negative stiffness, a second curved crease corresponding to a zero stiffness, and a third curved crease corresponding to a positive stiffness.

4. The curved origami-based metamaterial of claim 1, wherein the plurality of curved creases includes two curved creases of negative stiffness, wherein the two curved creases of negative stiffness are configured to be activated to turn the ON/OFF switch on and deactivated to turn the switch off.

5. The curved origami-based metamaterial of claim 4, wherein the clipper has a positive stiffness, and wherein the combination of the ON/OFF switch and the clipper is configured to be used as a gripping device to grip an object.

6. The curved origami-based metamaterial of claim 1, wherein the plurality of curved creases define a Miura pattern along the panel.

7. The curved origami-based metamaterial of claim 6, wherein the Miura pattern includes a pattern of cells each having at least one of the plurality of curved creases, wherein the cells are arranged in a first row of cells and a second row of cells, such that along the first row of cells a direction of the plurality of curved creases is identical and each curved crease faces in a first direction, and such that along the second row of cells a direction of the plurality of curved creases is identical and each curved crease faces in a second, opposite direction.

8. The curved origami-based metamaterial of claim 6, wherein the panel is coupled to a paddle, such that the origami-based metamaterial defines a swimming robot.

9. The curved origami-based metamaterial of claim 1, wherein the panel is a first panel, wherein the origami-based metamaterial includes at least one additional panel coupled to the first panel.

10. The curved origami-based metamaterial of claim 9, wherein panel and the at least one additional panel define a cube structure.

11. The curved origami-based metamaterial of claim 10, wherein the at least one additional panel includes a plurality of curved creases.

12. A method of stiffness manipulation in situ, the method comprising:
providing the curved origami-based metamaterial of claim 1;
folding the panel about a selected one of the plurality of curved creases;
activating the selected curved crease by bending the panel after the step of folding; and
activating a different one of the plurality of curved creases to change an overall stiffness of the panel.

13. The method of claim 12, wherein the plurality of curved creases includes a first curved crease corresponding to a negative stiffness, a second curved creased corresponding to a zero stiffness, and a third curved crease corresponding to a positive stiffness.

14. A universal gripper comprising:
a first plastic film;
a second plastic film;
wherein each of the first and second plastic films includes a set of curved creases, and wherein stiffness manipulation is configured to be achieved in situ by activating and deactivating the curved creases;
wherein the first plastic film defines an ON/OFF switch of the gripper, and wherein the second plastic film defines a clipper configured to grip an object.

15. The universal gripper of claim 14, wherein the curved creases are arranged such that when the curved creases are activated the ON/OFF switch is turned on, and such that when a sufficient pressure is applied to the first plastic film, the first plastic film is configured to cause a snap-through.

16. A curved origami-based metamaterial comprising:
a panel of material having a plurality of curved creases each disposed within a plane of the panel;
wherein the panel is configured to be folded along one of the plurality of creases, and wherein the panel is also configured to be bent about an axis disposed outside the plane of the panel;
wherein stiffness manipulation is configured to be achieved in situ by activating a different one of the plurality of curved creases;
wherein the plurality of curved creases define a Miura pattern along the panel;
wherein the panel is coupled to a paddle, such that the origami-based metamaterial defines a swimming robot.

* * * * *